United States Patent
Park et al.

(10) Patent No.: US 9,030,916 B2
(45) Date of Patent: May 12, 2015

(54) METHOD AND SYSTEM FOR MONITORING FIRE BASED ON DETECTION OF SOUND FIELD VARIATION

(71) Applicant: Electronics and Telecommunications Research Institute, Daejeon (KR)

(72) Inventors: Kang-Ho Park, Daejeon (KR); Sung Q Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 295 days.

(21) Appl. No.: 13/783,185

(22) Filed: Mar. 1, 2013

(65) Prior Publication Data

US 2013/0250729 A1    Sep. 26, 2013

(30) Foreign Application Priority Data

Mar. 23, 2012  (KR) .................. 10-2012-0030074
Aug. 23, 2012  (KR) .................. 10-2012-0092133

(51) Int. Cl.
*G01S 15/88* (2006.01)
*G01S 15/04* (2006.01)
*G08B 17/00* (2006.01)

(52) U.S. Cl.
CPC ............. *G01S 15/88* (2013.01); *G01S 15/04* (2013.01); *G08B 17/00* (2013.01)

(58) Field of Classification Search
CPC ............................. G01S 15/88; G08B 17/00
USPC ......................................................... 367/96
See application file for complete search history.

(56) References Cited

U.S. PATENT DOCUMENTS

| | | | |
|---|---|---|---|
| 2006/0192670 A1 | 8/2006 | Tice | |
| 2009/0184830 A1* | 7/2009 | Watabe et al. | 340/628 |
| 2010/0259396 A1 | 10/2010 | Watabe et al. | |
| 2013/0250729 A1* | 9/2013 | Park et al. | 367/87 |
| 2014/0307096 A1* | 10/2014 | Park et al. | 367/87 |

FOREIGN PATENT DOCUMENTS

| JP | 2000-268265 A | 9/2000 |
|---|---|---|
| KR | 10-2007-0119593 A | 12/2007 |
| KR | 10-2009-0082800 A | 7/2009 |

* cited by examiner

*Primary Examiner* — Daniel Pihulic

(57) ABSTRACT

Disclosed are a method and a system for monitoring a fire based on a detection of sound field variation. The system for monitoring a fire based on a detection of sound field variation includes: a sound generator outputting a sound wave within a defined space according to input voltage; a sound receiver receiving the sound wave within the defined space and obtaining a sound pressure from the received sound wave; and a fire monitor using a sound transfer function representing a ratio of the sound pressure obtained by the sound receiver to input voltage of the sound generator in a preparation mode to calculate reference sound pressure information, using the sound transfer function in a monitoring mode to calculate current sound pressure information, and comparing the reference sound pressure information with the current sound pressure information to determine whether a fire occurs.

16 Claims, 5 Drawing Sheets

(a)

(b)

METHOD AND SYSTEM FOR MONITORING FIRE BASED ON DETECTION OF SOUND FIELD VARIATION

CROSS-REFERENCE TO RELATED APPLICATIONS

This application is based on and claims priority from Korean Patent Application Nos. 10-2012-0030074, filed on Mar. 23, 2012, and 10-2012-0092133, filed on Aug. 23, 2012, with the Korean Intellectual Property Office, the disclosure of which is incorporated herein in its entirety by reference.

TECHNICAL FIELD

The present disclosure relates to a method for monitoring a fire, and more particularly, to a method and a system for monitoring a fire based on a detection of sound field variation capable of early detecting a fire even in the state in which flame or smoke is invisible, by detecting the sound field variation within a fire monitoring space occurring due to an effect of a change in air density and a speed of a sound wave according to a change in temperature of surrounding air due to a fire on a transfer of a sound wave.

BACKGROUND

A system for monitoring a fire has been researched for a long period of time and includes, for example, a temperature detecting scheme, a smoke detecting scheme, a flame detecting scheme, and the like.

As the related art, Korean Patent Laid-Open Publication No. 10-2007-0119593 (Composite fire detector for the detection of smoke, flame, and heat) discloses a composite fire detector that uses a single fire detector integrated with a heat detector, a smoke detector, and a flame detector to simultaneously provide a smoke detecting function for preparing against spontaneous combustion and a flame detecting function for preparing against a fire. The composite fire detector has a low error rate for various fire situations and can detect a fire from the beginning.

However, the composite fire detector does not detect a fire well at the time of an initial fire in which a temperature or a smoke density of a position at which a detection sensor is installed is not high and cannot detect flame when flame is hidden by objects or a fire occurs at an isolated dead zone and thus, cannot detect a fire in the early stage.

As another related art, Korean Patent Laid-Open Publication No. 10-2009-0082800 (Fire detection system) discloses a fire detection system including various sensors and a signal processing unit to detect flame, smoke, and heat, thereby accurately detecting fire occurrence and to transmit the detected information, thereby reducing malfunction and non-operation.

However, the fire detection system can sense smoke or heat in the state in which a fire somewhat progresses and it is difficult to detect an initial fire occurring at a spot hidden by objects, an isolated spot, or a hidden dead zone.

As another related art, US Patent Laid-Open Publication No. 2006/0192670 (Multi-senor device and methods for fire detection) discloses a fire detector using a multi-sensor that uses a multi-sensor coupled with a smoke senor or a heat sensor while basically using an optical sensor to minimize a malfunction of a fire alarm.

However, it is also difficult for the fire detector using the multi-sensor to detect a fire occurring at a spot hidden by objects, an isolated spot, or a hidden dead zone.

SUMMARY

The present disclosure has been made in an effort to provide a method and a system for monitoring a fire based on a detection of sound field variation which can detect an initial fire occurring at a dead zone and has quickness and reliability of fire detection.

The present disclosure has also been made in an effort to provide a method and a system for monitoring a fire based on a detection of sound field variation providing a universal security monitoring system by being complementarily configured with the existing intrusion detection system.

An exemplary embodiment of the present disclosure provides a system for monitoring a fire based on a detection of sound field variation, including: a sound generator outputting a sound wave within a defined space according to input voltage; a sound receiver receiving the sound wave within the defined space and obtaining a sound pressure from the received sound wave; and a fire monitor using a sound transfer function representing a ratio of the sound pressure obtained by the sound receiver to the input voltage of the sound generator in a preparation mode to calculate reference sound pressure information, using the sound transfer function in a monitoring mode to calculate current sound pressure information, and comparing the reference sound pressure information with the current sound pressure information to determine whether a fire occurs.

Another exemplary embodiment of the present disclosure provides a method for monitoring a fire based on a detection of sound field variation, including: outputting, by a sound generator, a sound wave within a defined space according to input voltage; receiving, by a sound receiver, the sound wave within the defined space and obtaining a sound pressure from the received sound wave; calculating, by a fire monitor, reference sound pressure information using a sound transfer function representing a ratio of the sound pressure obtained by the sound receiver to the input voltage of the sound generator in a preparation mode; and calculating, by the fire monitor, current sound pressure information using the sound transfer function in a monitoring mode and comparing the reference sound pressure information with the current sound pressure information to determine whether a fire occurs.

As set forth above, according to the exemplary embodiments of the present disclosure, it is possible to reduce the malfunction/non-operation probability of the system for monitoring a fire and monitor the initial fire occurring at the dead zone by providing the method and system for monitoring a fire based on a detection of sound field variation.

It is also possible to provide the universal security monitoring system capable of monitoring the intrusion and the fire occurrence, by providing the system for monitoring a fire based on the detection of sound field variation which is complementarily configured with the existing intrusion detection system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
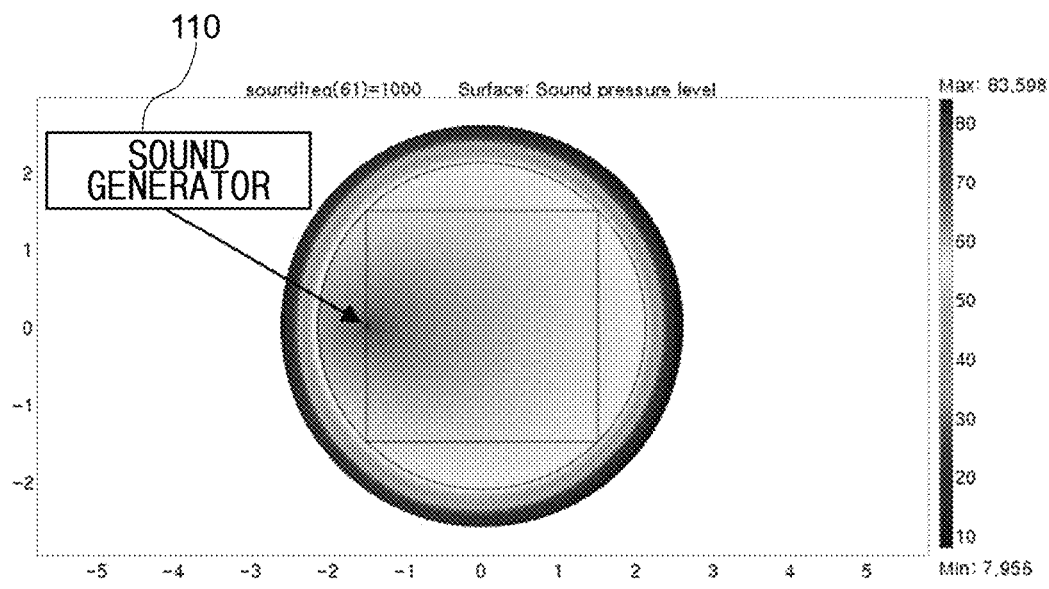
FIG. 1 is a diagram for theoretically describing a process of generating sound field variation according to a local change in air density and a change in a speed of a sound wave at the time of fire occurrence within a fire monitoring space.
Figure 1:
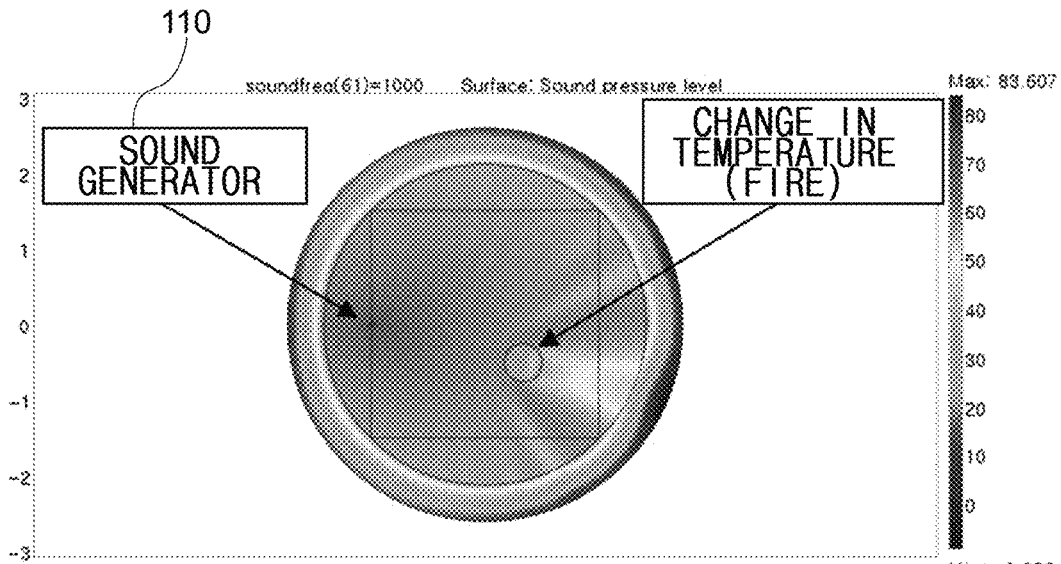

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

According to an exemplary embodiment of the present disclosure, there is provided a method and a system for monitoring a fire based on a detection of sound field variation, by allowing a sound generator to propagate an audible frequency having a predetermined sound pressure and a sound wave of an ultrasonic wave into a fire monitoring space at a predetermined time interval, a sound receiver to receive a sound wave within a fire monitoring space, and a fire monitor to calculate an acoustic transfer function value determined at a ratio of a sound pressure obtained by the sound receiver and compare a maximum value of deviations in reference sound pressure information for each frequency, that is, an absolute value of a difference value between an average of reference sound pressure information for each frequency to an initial deviation and an average of current sound pressure information for each frequency, that is, an average value of the sound pressure information variations (signal/noise) with a fire determining reference value to determine whether a fire occurs.

According to the exemplary embodiment of the present disclosure, there is provided a method and a system for monitoring a fire based on a detection of sound field variation capable of improving accuracy of fire detection, by allowing a sound generator to generate a sound source of sine waves having different frequencies and a fire monitor to detect a pattern in which sound pressure information such as a size or a phase of a sound pressure is changed according to a magnitude of a frequency within a fire monitoring space and comprehensively analyze a temporal change in sound pressure information variations to an initial deviation and a change according to a frequency to determine whether an event occurring within a fire monitoring space depends on intrusion or a fire.

A system for monitoring a fire based on a detection of sound field variation according to the exemplary embodiment of the present disclosure includes a sound generator generating a sound wave, a sound receiver detecting a sound wave, and a fire monitor monitoring a fire, wherein the fire monitor processes the acoustic signal measured by the sound receiver to obtain sound pressure information variations to an initial deviation, compares the obtained sound pressure information variations to an initial deviation with the fire determining generation reference value to determine whether a fire occurs, and transmits the photographed image to a manager or a user of a specific mobile phone if it is determined that a fire occurs.

A system for monitoring a fire based on a detection of sound field variation according to the exemplary embodiment of the present disclosure compositely determines the fire occurrence, together with a camera, a temperature detection sensor, a smoke detection sensor, a flame detection sensor, and the like, thereby increasing reliability of fire monitoring and early monitoring a fire.

FIG. 1 is a diagram for theoretically describing a process of generating sound field variation according to a local change in air density and a change in a speed of a sound wave at the time of fire occurrence within a fire monitoring space.

As illustrated in FIG. 1, a sound wave generated from a sound generator 110 due to a change in air density and a speed of a sound wave around a fire is reflected, refracted, or diffracted at a boundary having a different air density. Therefore, a phenomenon in which a wavelength of a sound wave varies within air having a different temperature appears, such that a sound pressure of air detected by the sound receiver installed within the fire monitoring space varies. The phenomenon of sound field variation may be generated more frequently within an acoustic space in which an echo of a sound wave occurs more frequently and when the sound field variation is detected, a fire at a dead zone in which flame or smoke is not observed may be detected early.

A theoretical analysis condition is as follows. FIGS. 1A and 1B each illustrate graphs obtained by two-dimensionally mapping a sound pressure level within a fire monitoring space by analyzing based on a two-dimensional finite element analysis method the situation in which a sound wave of 1 kHz generated at an acceleration of 10 m/s$^2$ from the sound generator 110 is propagated into the fire monitoring space, in the state of a normal temperature (18° C.) before a fire occurs within a two-dimensional anechoic space of 3 m×3 m without an echo and the state in which an air temperature in a circle having a diameter of 50 cm rises to 200° C. due to a fire. The phenomenon appears at most of sound waves and the sound field variation may be detected by the sound receiver (not illustrated) that is installed in the fire monitoring space. Since the sound waves are not dispersed well in the actual space in which an echo frequently occurs and are reflected in the fire monitoring space and overlap each other, the increase in temperature due to a fire may incur the even greater sound field variation to more easily detect the fire occurrence.

Figure 2:
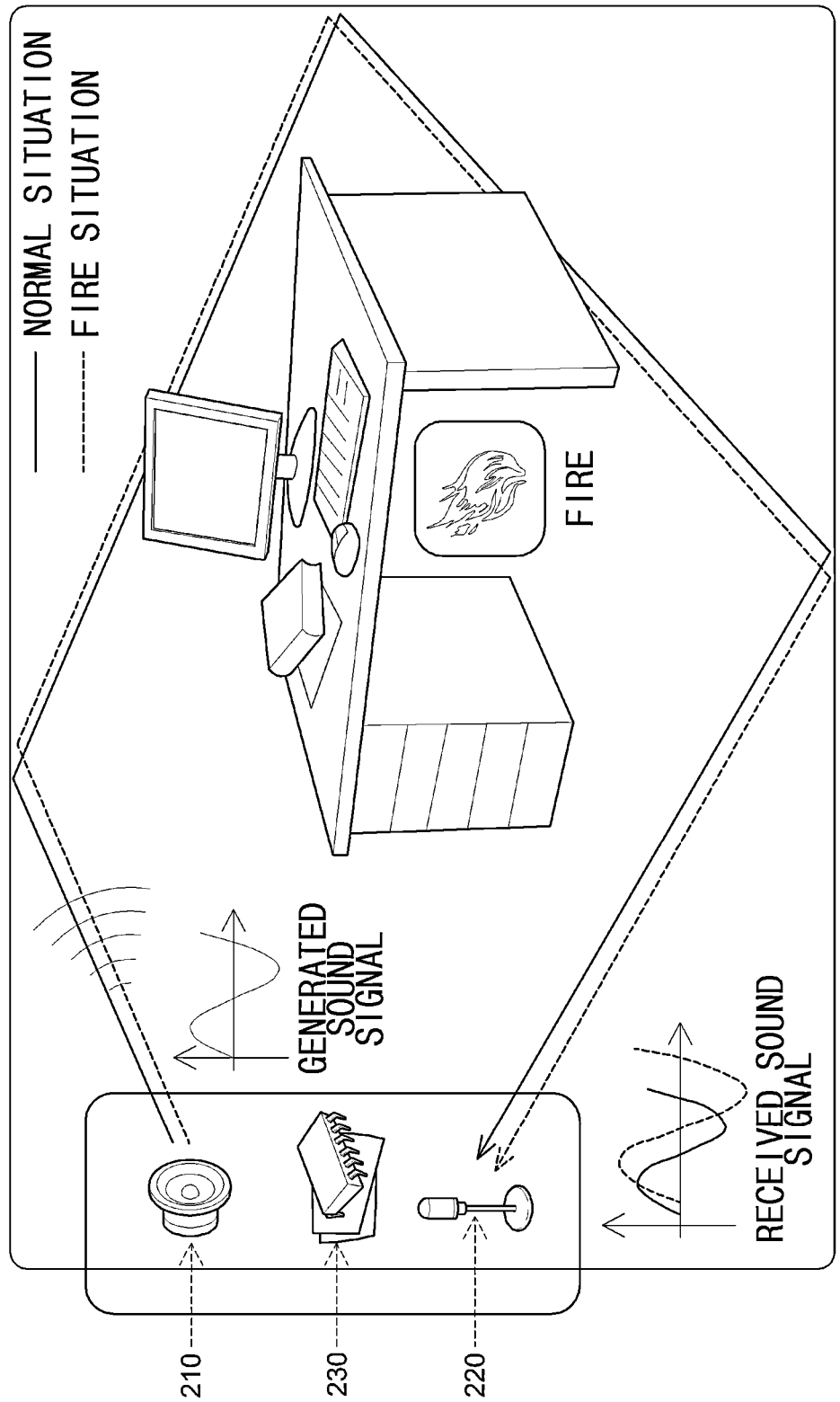
FIG. 2 is a diagram illustrating a configuration of a system for monitoring a fire based on a detection of sound field variation according to an exemplary embodiment of the present disclosure.

FIG. 2 is a diagram illustrating a configuration of a system for monitoring a fire based on a detection of sound field variation according to an exemplary embodiment of the present disclosure.

Referring to FIG. 2, a system for monitoring a fire according to an exemplary embodiment of the present disclosure includes a sound generator 210, a sound receiver 220, a fire monitor 230, and the like.

The sound generator 210 outputs a sound wave within a fire monitoring space according to input voltage. In this configuration, the sound generator 210 may use a continuous wave and a pulse wave of a multi-tone sound source consisting of a single sine wave of an audible frequency of 20 to 20000 Hz and an ultrasonic wave of 20 kHz or more or a linear sum of sine waves having a plurality of frequencies, or a pink noise and white noise sound source, and the like. A sound volume of the sound generator 210 may be set to have an optimal size enough to detect the fire occurrence.

The sound receiver 220 receives a sound wave within the fire monitoring space and obtains a sound pressure from the received sound wave. Here, the sound receiver 220 may include a frequency conversion filter that converts the received sound wave into a frequency domain.

The fire monitor 230 according to the exemplary embodiment of the present disclosure, which is a measure for detecting a situation of the fire monitoring space, uses sound transfer functions H(S) and H'(s). Here, the sound transfer functions H(S) and H'(s) depend on a scheme of obtaining a general transfer function and represents a Pout/Vin value that is a ratio of a sound pressure Pout obtained by the sound receiver 220 to input voltage Vin of the sound generator 210.

As a result, the fire monitor 230 uses the sound transfer function H(s) in a preparation mode to calculate the reference sound pressure information (magnitude in reference sound pressure Amp=20 log (H(s)) or a phase of the reference sound pressure Ph=ang (H(s)). In this case, the fire monitor 230 measures sound field variation patterns for each time by calculating the sound pressure information and an average and a deviation of the sound pressure information for each frequency so as to exclude a change in the sound transfer function H(s) due to a gradual change in temperature and humidity of air or a change in environment such as convection, and the like, and analyzes the measured sound field variation patterns for each time to set an initialization time period and a fire determining reference value.

As a result, the fire monitor 230 uses the sound transfer function H'(s) in a monitoring mode to calculate the current sound pressure information (magnitude in current sound pressure Amp=20 log (H(s)) or a phase of the current sound pressure Ph=ang (H(s)) and compare the reference sound pressure information with the current sound pressure information to determine whether a fire occurs. In detail, the fire monitor 230 determines that a fire occurs, when an average value of signal values (hereinafter, 'sound pressure information variations to initial deviation') that is an absolute value 20 log (H'(s)−20 log (H(s)) of a difference value between an average of the reference sound pressure information for each frequency to initial deviation (noise) that is a maximum value of deviation in the reference sound pressure information for each frequency and an average of the current sound pressure information for each frequency is the fire determining reference value or more. In this case, the fire monitor 230 may calculate the sound pressure information and the average and a deviation of the sound information for each frequency at the initialization time period in the monitoring mode to reset the initialization time period and the fire determining reference value, so as to prevent a fire alarm from ringing due to the change in the sound transfer function H(s) caused by the gradual change of temperature and humidity of air, the convection, and the like.

Meanwhile, the sound transfer functions H(s) and H'(s) may be changed even by a fire and intrusion and therefore, it is difficult to determine the intrusion or the fire only by the measurement of the sound field variation. To this end, the fire monitor 230 detects the sound field variation pattern for each time and/or frequency and compares the detected sound field variation patterns for each time and/or frequency with the pre-stored sound field variation patterns for each time and/or frequency to determine whether the sound field variation occurs due to a fire or other events such as intrusion, and the like. The detailed description thereof will be described below with reference to FIG. 5.

A system for monitoring a fire according to an exemplary embodiment of the present disclosure may further include a camera (not illustrated) for photographing an image when the fire monitor 230 confirms the fire occurrence.

The fire monitor 230 may transmit an image photographed by a camera (not illustrated) to a mobile phone or servers of a security office, a security company, a police station, and the like, through a wired and wireless communication network.

As described above, a system for monitoring a fire based on a detection of sound field variation according to the exemplary embodiment of the present disclosure can rapidly and effectively implement a security system service by autonomously detecting a risk situation of security at the beginning of the fire and intrusion situation and secondarily storing the image photographed by the camera or transmitting the image to a mobile phone or servers of a security office, a security company, a police station, and the like.

Figure 3:
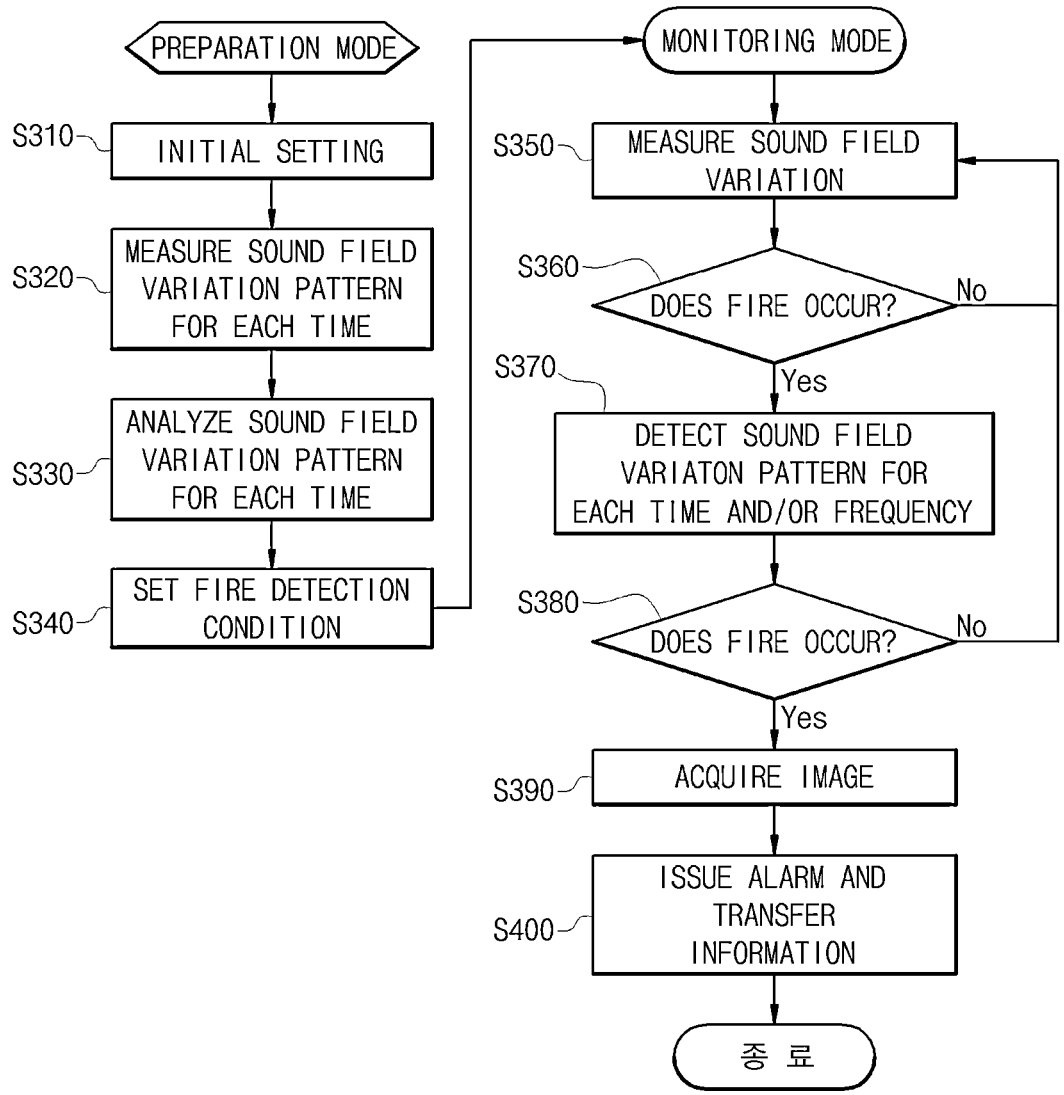
FIG. 3 is a flowchart illustrating a method for monitoring a fire based on a detection of sound field variation according to the exemplary embodiment of the present disclosure.

FIG. 3 is a flowchart illustrating a method for monitoring a fire based on a detection of sound field variation according to the exemplary embodiment of the present disclosure.

Referring to FIG. 3, the method for monitoring a fire according to an exemplary embodiment of the present disclosure is largely divided into the preparation mode and the monitoring mode, wherein the preparation mode includes initial setting (S310), measuring the sound field variation patterns for each time (S320), analyzing the sound field variation patterns for each time (S330), and setting the fire monitoring condition (S340) and the monitoring mode includes measuring the sound field variation (S350), determining the fire occurrence (S360), detecting the sound field variation patterns for each time and/or frequency (S370), confirming the fire occurrence (S380), acquiring an image (S390), and issuing an alarm and transferring information (S400).

In the initial setting (S310), the sound generator 210 is turned-on within the defined space to output the sound wave according to the input voltage, the sound receiver 220 is turned-on to receive the sound wave, and the fire monitor 230 uses the sound transfer function representing a ratio of the sound pressure obtained by the sound receiver 220 to the input voltage of the sound generator 210 to calculate and store the reference sound pressure information and the average and the deviation of the reference sound pressure information for each frequency.

In the measuring of the sound field variation patterns for each time (S320), the fire monitor 230 uses the sound transfer function to calculate the current sound pressure information and the average and the deviation of the current sound pressure information for each frequency and compare the current sound pressure information and the average and the deviation of the current sound pressure information for each frequency with the reference sound pressure information and the average and the deviation of the reference sound pressure information for each frequency, respectively, to measure the sound field variation patterns for each time.

In the analyzing of the sound field variation patterns for each time (S330), the fire monitor 230 analyzes the measured sound field variation patterns for each time and then, stores the sound field variation index values for each time.

In the setting of the fire monitoring condition (S340), the fire monitor 230 refers to the stored sound field change index values for each time to set the initialization time period and the fire determining reference value.

In the measuring of the sound field variation (S350), the fire monitor 230 uses the sound transfer function to calculate the current sound pressure information and the average and the deviation of the current sound pressure information for each frequency. In this case, the fire monitor 230 may reset the initialization time period and the fire determining reference value at the initialization time period interval.

In the determining of the fire occurrence (S360), it is determined whether a fire occurs by comparing the current sound pressure information and the average and the deviation of the current sound pressure information for each frequency with the reference sound pressure information and the average and the deviation of the reference sound pressure information for each frequency, respectively. In detail, the fire monitor 230 determines that a fire occurs when the average value of the sound pressure information variations to the initial deviation (S/N) is the fire determining reference value or more.

In the detecting of the sound field variation patterns for each time and/or frequency (S370), the fire monitor 230 detects the sound field variation patterns for each time and/or frequency if it is determined that a fire occurs.

In the confirming whether a fire occurs (S380), the fire monitor 230 confirms whether the sound field variation occurs due to a fire or other events such as intrusion, and the like, by comparing the sensed sound field variation patterns for each time and/or frequency with the pre-stored sound field variation patterns for each time and/or frequency.

In the acquiring of the image (S390), when it is confirmed that a fire occurs, the camera performs the image photographing so as to confirm whether a fire occurs once more In the issuing of the alarm and the transferring of the information (S400), the fire monitor 230 issues a fire alarm and transmits an image photographed by a camera to a mobile phone or servers of an security office, a security company, a police station, and the like, through a wired/wireless communication network.

Figure 4A:
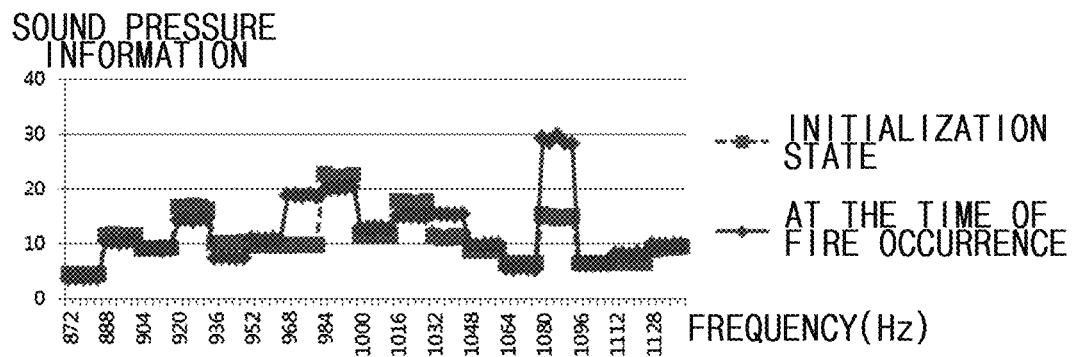
FIG. 4A is a graph illustrating compared results of sound pressure information for each frequency after and before fire occurrence within a fire monitoring space.
Figure 4B:
FIG. 4B is a graph illustrating sound pressure information variations to an initial deviation over time at the time of fire occurrence within the fire monitoring space.

FIG. 4A is a graph illustrating compared results of sound pressure information for each frequency after and before fire occurrence within a fire monitoring space and FIG. 4B is a graph illustrating sound pressure information variations to an initial deviation over time at the time of fire occurrence within the fire monitoring space.

FIG. 4A is a graph illustrating a compared result of the sound pressure information for each frequency in an initial state before a fire occurs which is obtained by performing Fourier transform on the sound transfer function value with the sound pressure information for each frequency after a fire occurs, when the sound generator generates a multi-tone sound source configured of a linear sum of sine waves having all the seventeen frequencies by 8 before and after while a frequency span is 16 Hz based on a central frequency of 1 kHz within the fire monitoring space, the sound receiver receives the sound wave, and the fire monitor calculates the sound transfer function value representing the ratio of the sound pressure obtained by the sound receiver to the input voltage of the sound generator.

The constructive and destructive interference occurs within the fire monitoring space due to the overlapping of the sound waves having a specific frequency and therefore, as illustrated in FIG. 4A, the constructive and destructive interference of the sound waves are remarkably shown differently for each frequency. Therefore, the deviation in the sound pressure information occurs even in the same frequency whenever the sound wave is measured. In the present disclosure, the sound pressure information is continuously measured at a predetermined number of times (for example, five times) in the same frequency, which is illustrated in FIG. 4A.

When the initial deviation representing the maximum value of the deviation in the reference sound pressure information for each frequency is represented by noises for each frequency, the average value of the current sound pressure information for each frequency is calculated, and the calculated average value compares with the average value of the reference sound pressure information for each frequency to represent by a signal the signal value representing an absolute value of the difference value of the sound pressure information measured in a predetermined time unit, FIG. 4B is a graph illustrating an average value of a ratio (signal/noise) of a signal value to noise at each frequency on a time base.

The signal value is gradually changed according to a gradual change in air temperature is changed bit by bit, but as illustrated in FIG. 4B, when a fire occurs, the signal value is suddenly changed. The system for monitoring a fire according the exemplary embodiment of the present disclosure detects the changed signal value to detect the fire. The system for monitoring a fire according to the exemplary embodiment of the present disclosure may use various sound sources when being actually used and may use a low frequency or a high frequency or a pulse sound source and an ultrasonic wave so as to minimize noise due to the generated sound wave.

Meanwhile, the sound pressure information is changed by a fire and other events such as intrusion, and the like and therefore, it is difficult to certainly differentiate a fire or other events only by the measurement of the sound field variation. The system for monitoring a fire based on a detection of sound field variation according to the exemplary embodiment of the present disclosure uses the sound source of a sine wave having various frequencies to determine whether the sound field variation within a predetermined space occurs due to a fire or other events.

Figure 5A:
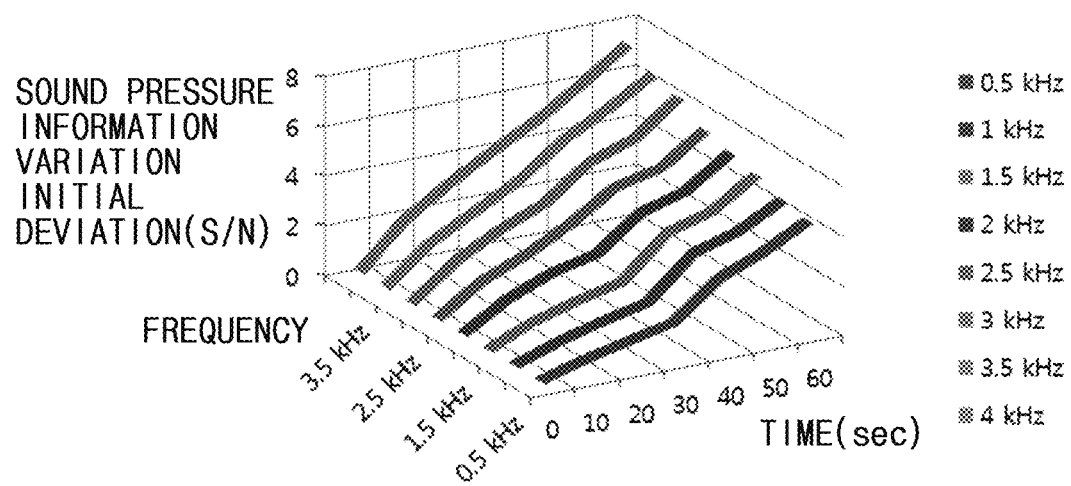
FIG. 5A is a graph illustrating a change pattern of sound pressure information variations to initial deviation for each time and frequency at the time of fire occurrence.
Figure 5B:
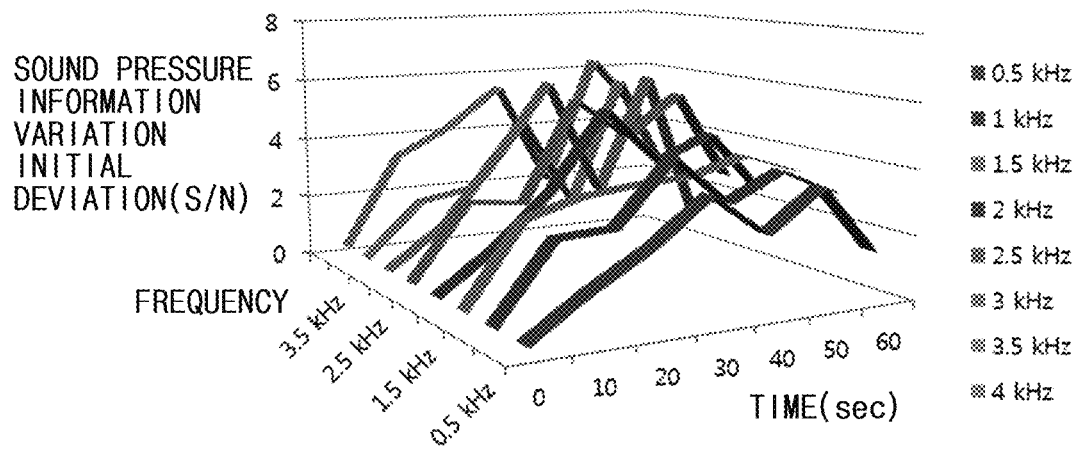
FIG. 5B is a graph illustrating a change pattern of sound pressure information variations to initial deviation for each time and frequency at the time of intrusion occurrence.

FIG. 5A is a graph illustrating a change pattern of sound pressure information variations to initial deviation for each time and frequency at the time of fire occurrence and FIG. 5B is a graph illustrating a change pattern of sound pressure information variations to initial deviation for each time and frequency at the time of intrusion occurrence.

It can be appreciated from FIG. 5A that the sound field is gradually changed according to the change in time and frequency under a process of changing from fire occurrence to a big fire.

It can be appreciated from FIG. 5B that the sound field is irregularly changed according to the change in time and frequency at the time of the intrusion.

Using the foregoing principle, the system for monitoring a fire based on a detection of sound field variation according to the exemplary embodiment of the present disclosure detects the sound field variation patterns for each time and/or frequency and compares the detected sound field variation patterns for each time and/or frequency with the pre-stored sound field variation patterns for each time and/or frequency to determine whether the sound field variation occurs due to a fire or intrusion.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for monitoring a fire based on a detection of sound field variation, comprising:
   a sound generator outputting a sound wave within a defined space according to input voltage;
   a sound receiver receiving the sound wave within the defined space and obtaining a sound pressure from the received sound wave; and
   a fire monitor using a sound transfer function representing a ratio of the sound pressure obtained by the sound receiver to the input voltage of the sound generator in a preparation mode to calculate reference sound pressure information, using the sound transfer function in a monitoring mode to calculate current sound pressure information, and comparing the reference sound pressure information with the current sound pressure information to determine whether a fire occurs.

2. The system of claim 1, wherein the fire monitor calculates sound pressure information and an average and a deviation of sound pressure information for each frequency to measure sound field variation patterns for each time and analyzes the measured sound field variation patterns for each time to set an initialization time period and a fire determining reference value.

3. The system of claim 2, wherein when an average value of an absolute value that is a difference value between an average of the reference sound pressure information for each frequency and an average of current sound pressure information for each frequency to a maximum value of the deviation in the reference sound pressure information for each frequency is the fire determining reference value or more, the fire monitor determines that a fire occurs.

4. The system of claim 2, wherein the fire monitor calculates the sound pressure information and the average and the deviation of the sound pressure information for each frequency at the initialization time period interval to reset the initialization time period and the fire determining reference value.

5. The system of claim 1, wherein the sound generator uses at least one of a continuous wave and a pulse wave of a multi-tone sound source consisting of a single sine wave of an audible frequency of 20 to 20000 Hz and an ultrasonic wave of 20 kHz or more or a linear sum of sine waves having a plurality of frequencies and a pink noise and white noise sound source.

6. The system of claim 1, wherein the fire monitor detects sound field variation patterns for each time and/or frequency and compares the detected sound field variation patterns for each time and/or frequency with the pre-stored sound field variation patterns for each time and/or frequency to determine whether a fire occurs.

7. The system of claim 6, further comprising:
a camera photographing an image if the fire monitor determines that a fire occurs.

8. The system of claim 1, wherein the reference sound pressure information and the current sound pressure information are a size or a phase of the corresponding sound pressure.

9. The system of claim 1, wherein the sound receiver includes a frequency conversion filter converting the received sound wave into a frequency domain.

10. A method for monitoring a fire based on a detection of sound field variation, comprising:
outputting, by a sound generator, a sound wave within a defined space according to input voltage;
receiving, by a sound receiver, the sound wave within the defined space and obtaining a sound pressure from the received sound wave;
calculating, by a fire monitor, reference sound pressure information using a sound transfer function representing a ratio of the sound pressure obtained by the sound receiver to the input voltage of the sound generator in a preparation mode; and
calculating, by the fire monitor, current sound pressure information using the sound transfer function in a monitoring mode and comparing the reference sound pressure information with the current sound pressure information to determine whether a fire occurs.

11. The method of claim 10, wherein in the calculating of the reference sound pressure information, the fire monitor calculates sound pressure information and an average and a deviation of sound pressure information for each frequency to measure sound field variation patterns for each time and analyzes the measured sound field variation patterns for each time to set an initialization time period and a fire determining reference value.

12. The method of claim 11, wherein in the determining whether a fire occurs, when an average value of an absolute value that is a difference value between an average of the reference sound pressure information for each frequency and an average of current sound pressure information for each frequency to a maximum value of the deviation in the reference sound pressure information for each frequency is the fire determining reference value or more, the fire monitor determines that a fire occurs.

13. The method of claim 12, wherein in the determining whether a fire occurs, the fire monitor calculates the sound pressure information and the average and the deviation of the sound pressure information for each frequency at the initialization time period interval to reset the initialization time period and the fire determining reference value.

14. The method of claim 12, further comprising: after the determining of whether a fire occurs,
detecting, by the fire monitor, sound field variation patterns for each time and/or frequency; and
comparing, by the fire monitor, the detected sound field variation patterns for each time and/or frequency with the pre-stored sound field variation patterns for each time and/or frequency to determine whether a fire occur.

15. The method of claim 14, further comprising: after the determining of whether a fire occurs,
photographing, by a camera, an image if the fire monitor determines that a fire occurs.

16. The method of claim 10, wherein the reference sound pressure information and the current sound pressure information are a size or a phase of the sound pressure.

* * * * *